United States Patent

Sato et al.

[11] Patent Number: 5,940,646
[45] Date of Patent: *Aug. 17, 1999

[54] PHOTOGRAPHING OPERATION CONTROL DEVICE

[75] Inventors: Koichi Sato; Masato Okabe; Hironori Kamiyama; Osamu Shimizu; Yuudai Yamashita, all of Tokyo, Japan

[73] Assignees: Asahi Kogaku Kogyo Kabushiki Kaisha; Dai Nippon Printing Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,677

[22] Filed: Mar. 11, 1996

[30] Foreign Application Priority Data

Mar. 13, 1995 [JP] Japan ..................................... 7-080686
Jul. 25, 1995 [JP] Japan ..................................... 7-208501

[51] Int. Cl.⁶ .................................................. G03B 19/00
[52] U.S. Cl. .......................... 396/429; 358/471; 396/213
[58] Field of Search .................................... 396/228, 236, 396/233.34, 247, 226, 242–43, 273, 276, 213, 30, 429; 358/471; 399/3

[56] References Cited

U.S. PATENT DOCUMENTS

| | | | |
|---|---|---|---|
| 4,984,088 | 1/1991 | Tani et al. | 358/228 |
| 5,191,408 | 3/1993 | Takanashi et al. . | |
| 5,298,947 | 3/1994 | Aono et al. | 355/211 |
| 5,315,410 | 5/1994 | Takanashi et al. . | |
| 5,400,112 | 3/1995 | Takagi | 354/415 |
| 5,424,156 | 6/1995 | Aoki et al. . | |
| 5,631,700 | 5/1997 | Sato . | |
| 5,708,472 | 1/1998 | Morisawa et al. . | |
| 5,739,849 | 4/1998 | Aoki et al. . | |
| 5,805,945 | 9/1998 | Aoki . | |
| 5,808,675 | 9/1998 | Tamamoto . | |
| 5,842,050 | 11/1998 | Aoki . | |
| 5,857,125 | 1/1999 | Morisawa . | |

FOREIGN PATENT DOCUMENTS

| | | |
|---|---|---|
| 0327236 | 8/1989 | European Pat. Off. . |
| 2-29081 | 1/1990 | Japan . |
| 3278342 | 12/1991 | Japan . |
| 5-2280 | 1/1993 | Japan . |
| 5150251 | 6/1993 | Japan . |
| 5165005 | 6/1993 | Japan . |
| 6130347 | 5/1994 | Japan . |
| 7-13132 | 1/1995 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A photographing operation control device having an electro-developing recording medium to electronically develop an image formed thereon. The developing or photographing operation of the electro-developing recording medium is performed during a period when a recording medium activating signal is outputted. An exposure period for which the electro-developing recording medium is exposed is set based on a measured photometry value. When the exposure period is longer than a standard period for which the recording medium activating signal is outputted, the recording signal activating signal is outputted as pulse signals for a period equal to the exposure period. The operation period for which the pulse signals are outputted is set in such a manner that a total amount of the output period of the recording medium activating signal is equal to the standard period.

17 Claims, 14 Drawing Sheets

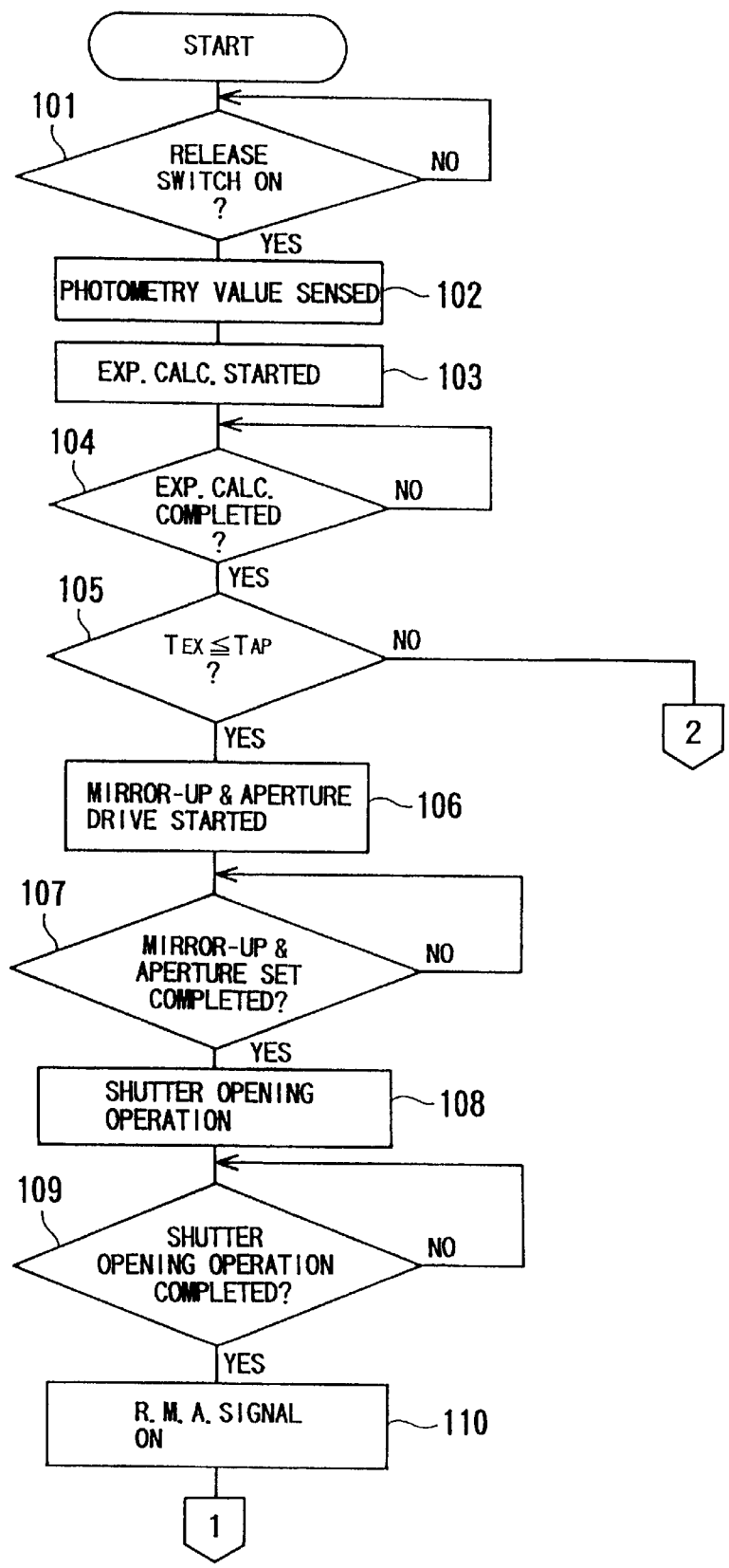

PHOTOGRAPHING OPERATION CONTROL DEVICE

BACKGROUND OF THE INVENTION

1. Field of the Invention

The present invention relates to a camera using a recording medium which electronically develops an image obtained by exposing the recording medium, and more particularly, to a device controlling a photographing operation of the camera.

2. Description of the Related Art

Conventionally, there is known a photographic material which electronically develops an optical image formed thereon through a photographing lens. Japanese Unexamined Patent Publication No. 5-2280, for example, discloses a recording material which is a combination of an electrostatic information recording material and an electric charge keeping medium. In this specification, such a recording medium is referred to as an electro-developing recording material, and a camera using the electro-developing recording material is referred to as an electro-developing type camera.

In the electro-developing recording medium disclosed in the above publication, the electrostatic information recording material has a photoconducting layer and an inorganic oxide material layer, and the electric charge keeping medium has a liquid crystal display. In this structure, when the electrostatic information recording material is exposed while an electric voltage is applied to the electrostatic information recording material and the electric charge keeping medium, an electric charge in accordance with the amount of incident light is generated in the electrostatic information recording material. Since the intensity of an electric field applied to the liquid crystal display facing the electrostatic information recording material varies in accordance with the generated electric charge, an image corresponding to the amount of light distribution is indicated or developed on the liquid crystal display.

Japanese Unexamined Patent Publication Nos. 5-150251, 5-165005, 6-130347 and 7-13132 disclose a liquid crystal display in which an image indicated on the liquid crystal display is kept even if the electric field applied to the liquid crystal display is removed.

The contrast of the image indicated on the liquid crystal display becomes greater in proportion with the time an electric voltage is started to be applied to the electro-developing recording medium, and when the image is bright, the contrast reaches a maximum when the electric voltage has been applied to the electro-developing recording medium for a predetermined period. Therefore, by stopping the voltage application at that time, an image having a high contrast can be obtained. Conversely, in order for the contrast to reach a maximum when the image is dark, the electric voltage needs to be applied to the electro-developing recording medium for a period longer than the predetermined period, therefore the contrast does not become great enough even if the voltage applying time is long. Thus, in this instance, the voltage applying time onto the electro-developing recording medium is set so that a contrast having a predetermined degree is obtained rather than for a predetermined time.

Nevertheless, when the exposure period for which the electro-developing recording medium is exposed is longer than the voltage applying time which is obtained by an exposure calculation based on a photometry value, a problem occurs in which a clear image cannot be recorded on the electro-developing recording medium, since the voltage applying is stopped during the exposure. On the other hand, as disclosed in Japanese Unexamined Patent Publication No. 3-278342, by setting an electric voltage, which is applied to the electro-developing recording medium, to a low value, the voltage applying time can be prolonged, but a problem occurs in that the liquid crystal display cannot display a clear image if the applied voltage is too low.

SUMMARY OF THE INVENTION

Therefore, an object of the present invention is to provide a photographing operation control device by which a clear image can be always recorded in the electro-developing recording medium regardless of the photometry value of a subject to be photographed.

According to the present invention, there is provided a photographing operation control device of an electro-developing type camera, the control device comprising an electro-developing recording medium, an output device, a performing device, and first determining device.

The electro-developing recording medium is provided for electronically developing an image which is formed by exposing the electro-developing recording medium. The output device outputs a recording medium activating signal so that the electro-developing recording medium can develop the image. The performing device performs an exposure calculation based on a photometry value, so that a set exposure period, for which the electro-developing recording medium is to be exposed to develop the image, is determined. The first determining device determines whether the set exposure period is shorter than a standard period. The output device continuously outputs the recording medium activating signal for the standard period when the set exposure period is shorter than the standard period, and the output device can intermittently output the recording medium activating signal so that a total amount of the intermittent output periods of the recording medium activating signal is equal to the standard period when the set exposure period is longer than the standard period.

According to another aspect of the present invention, there is provided a photographing operation control device of an electro-developing type camera, the control device comprising an electro-developing recording medium, an output device, a performing device, and first determining device.

The electro-developing recording medium is provided for electronically developing an image which is formed by exposing the electro-developing recording medium. The output device outputs a recording medium activating signal so that the electro-developing recording medium can develop the image. The performing device performs an exposure calculation based on a photometry value, so that a set exposure period, for which the electro-developing recording medium is to be exposed to develop the image, is determined. The first determining device determines whether the set exposure period is shorter than a maximum period for which the recording medium activating signal can be outputted. The output device sets an optimum voltage applied to the electro-developing recording medium and continuously outputs the recording medium activating signal having the optimum voltage, when the set exposure period is shorter than the maximum period. The output device can intermittently output the recording medium activating signal so that a total amount of the intermittent output periods of the recording medium activating signal is equal to the standard period, when the set exposure period is longer than the maximum period.

BRIEF DESCRIPTION OF THE DRAWINGS

The objects and advantages of the present invention will be better understood from the following description, with reference to the accompanying drawings in which:

FIG. 7A is a first part of a flow chart of a photographing operation;

DESCRIPTION OF THE PREFERRED EMBODIMENTS

Figure 1:
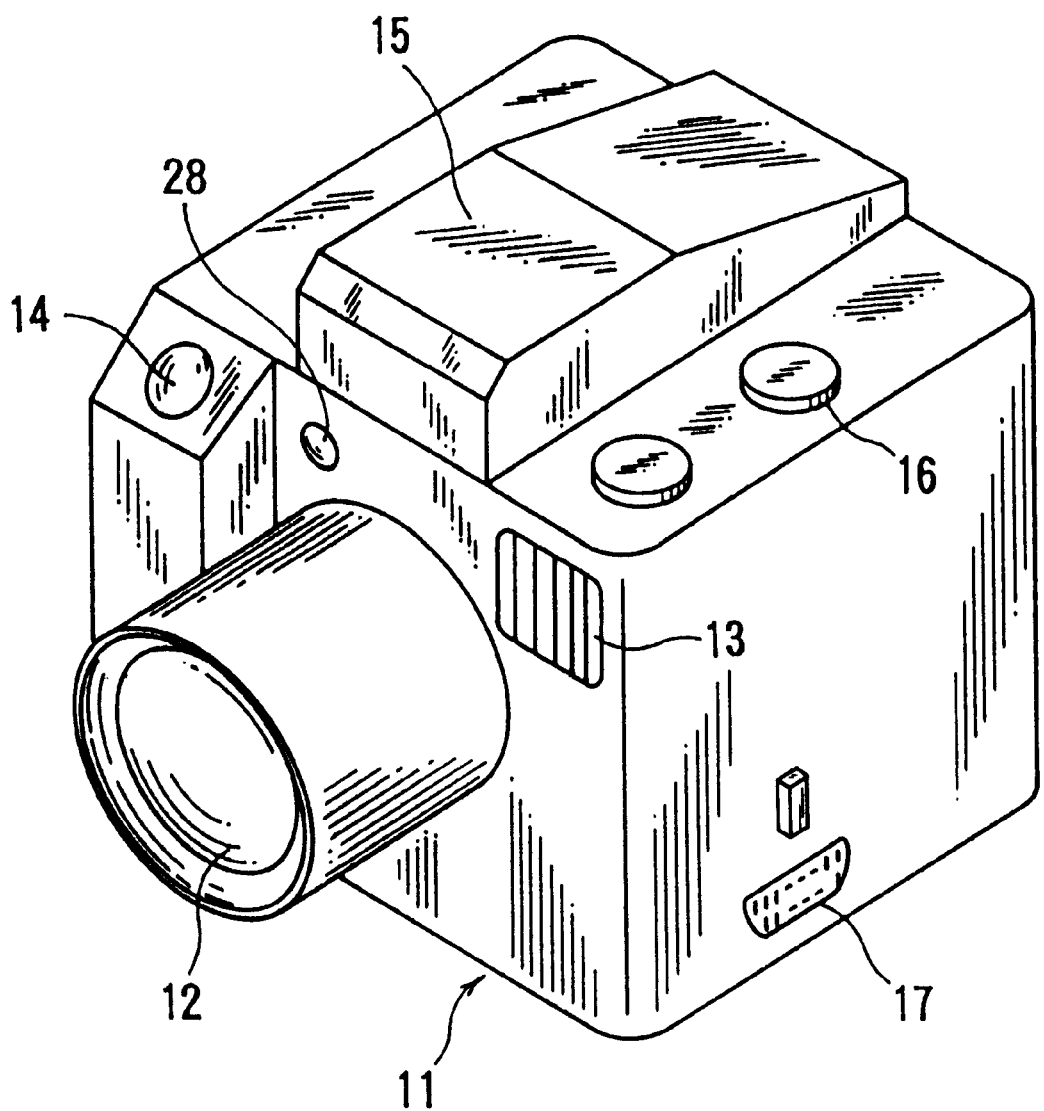
FIG. 1 is an external view showing a still video camera (electro-developing type camera) to which a photographing operation control device of first through fourth embodiments according to the present invention are applied.

FIG. 1 is an external view of a still video camera to which a photographing operation control device of first through fourth embodiments according to the present invention are applied. This still video camera is an electro-developing type camera which is constructed in such a manner that an image of an object to be photographed is developed by an electro-developing recording medium.

When viewing a camera body 11 from a front side, on the front surface of the camera body 11, a photographing optical system 12 including a photographing lens system and so on is provided on approximately a central portion of the front surface. Also on the front surface of the camera body 11, an electronic flash 13 is disposed on a portion to the right of and above the photographing optical system 12, and a photometry sensor 28 is disposed on a portion to the left of and above the photographing optical system 12. A release switch 14 is provided on the side opposite to the electronic flash 13. On the upper surface of the camera body 11, a view finder 15 is provided at the center portion thereof, and operation switches including a scan start switch 16 are provided on a side of the view finder 15. On a side surface of the camera body 11, an output terminal 17 is formed on a lower portion thereof so that an image signal obtained by this camera can be outputted to an external recording device.

Figure 2:
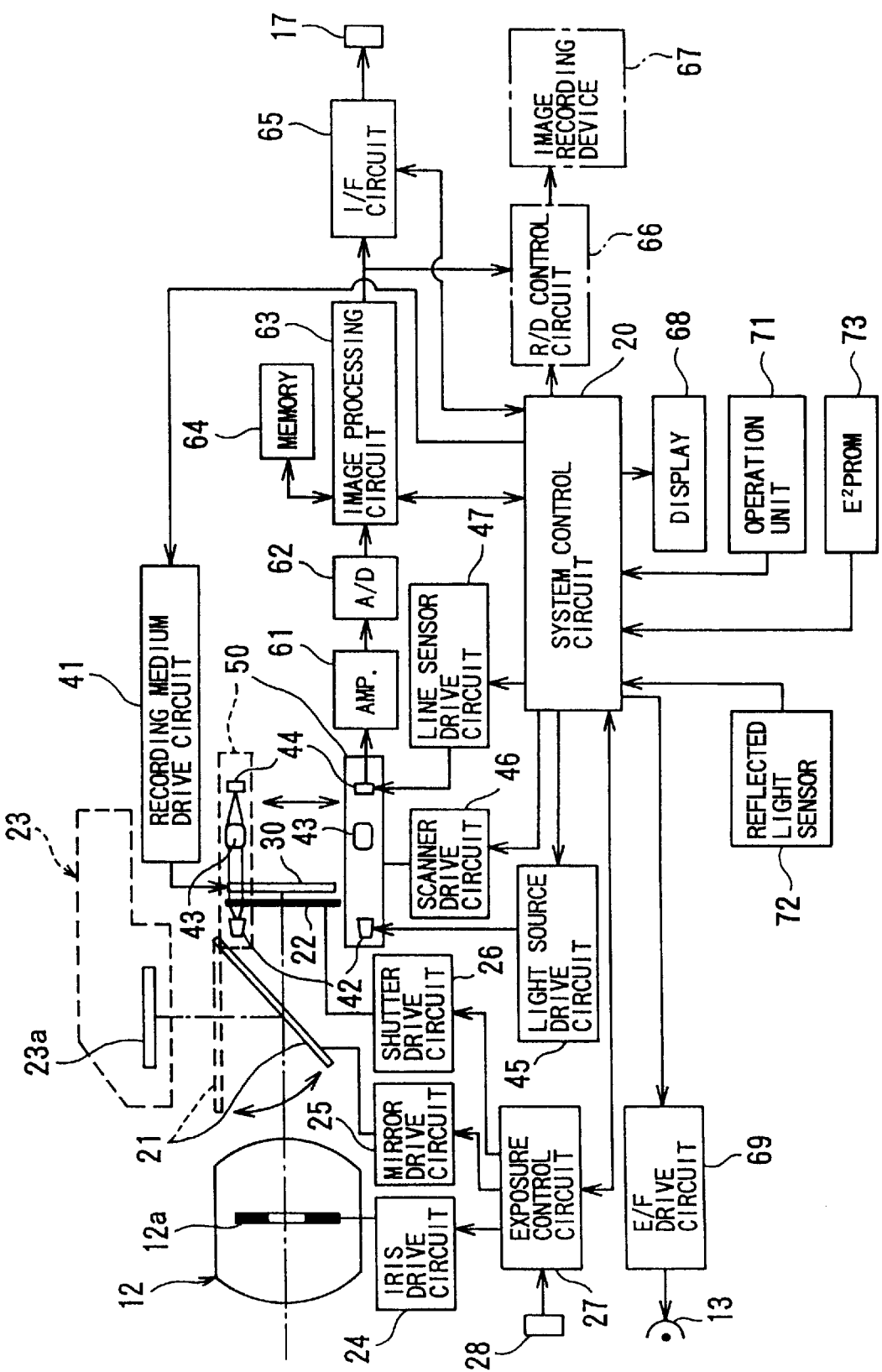
FIG. 2 is a block diagram of the still video camera.

FIG. 2 is a block diagram of the still video camera, in which a system control circuit 20 including a microcomputer is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing plate 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under the control of the exposure control circuit 27, based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period of time by the shutter drive circuit 26, under the control of the exposure control circuit 27. Thus, the light beam passing through the photographing optical system 12 enters a light receiving surface of the electro-developing recording medium 30, forming a two-dimensional image thereon. Note that, when a scanning operation of the scanning mechanism 50 is performed, the shutter 22 is opened. Namely, the shutter 22 is opened both when photography is performed and when scanning is performed.

An electric voltage is applied to the electro-developing recording medium 30, under the control of a recording medium drive circuit 41. By exposing the electro-developing recording medium 30 while applying the voltage, an image formed by the photographing optical system 12 is developed on the elector-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43 and a line sensor 44 are supported by the scanning mechanism 50, and are moved along the electro-developing recording material 30 by a scanning operation of the scanning mechanism 50.

The light source 42 includes an LED (light emitting diode) and a collimator lens, and emits a parallel light beam.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal.

The light source 42 can be moved along the front surface of the shutter 22 or the front surface of the electro-developing recording medium 30, and the line sensor 44 can be moved along the rear surface of the electro-developing recording medium 30.

The scanner optical system 43 is disposed between the light source 42 and the line sensor 44. When scanning is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44 due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the scanning optical system 43.

A light source drive circuit 45 is provided to perform the ON and OFF control of the light source 42. Control of the reading operation of the pixel signal generated in the line sensor 44 is carried out by a line sensor drive circuit 47. Control of the movement of the scanning mechanism 50 is performed by a scanner drive circuit 46. The circuits 45, 46 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction and so on by an image processing circuit 63 under control of the system control circuit 20, and then, are temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame of image signals.

The pixel signals outputted from the memory 64 are inputted into an interface circuit 65 through the image processing circuit 63, so that the pixel signals are subjected to a predetermined process, such as a format conversion, and can be outputted to an external display device (not shown) through the output terminal 17. The pixel signals outputted from the image process circuit 63 are subjected to a predetermined process, such as an image compression and a format conversion, in a recording device control circuit 66, so that the pixel signals can be recorded on a recording medium, such as an IC memory card, for example, in an image recording device 67. The interface circuit 65 and the recording device control circuit 66 are operated in accordance with a command signal outputted from the system control circuit 20.

An operation unit 71 having the release switch 14, the scan start switch 16, an auto-strobe selection switch and a strobe switch is connected to the system control circuit 20. A photographing operation is performed by operating the release switch 14. A reading operation of the pixel signals from the electro-developing recording medium 30 is performed by operating the scan start switch 16. The auto-strobe selection switch is provided for selecting an auto-strobe mode in which a radiation of the electronic flash 13 is performed in accordance with a luminance of the object to be photographed. The strobe switch is provided for radiating the electronic flash 13 compulsorily.

A display device 68 for indicating various setting conditions of the still video camera, an electronic flash drive circuit 69 for performing a flash control of the electronic flash 13, and a reflected light sensor 72 that senses the amount of light radiated by the electronic flash 13 and reflected by the object are also connected to the system control circuit 20.

Further, a writable nonvolatile memory (EEPROM) 73 is connected to the system control circuit 20. In this nonvolatile memory 73, data ($T_{AP}$, $T_{MAX}$, duty ratio and so on) related to an applying period of a recording medium activating signal described later, an applied voltage data ($V_{AP}$ and so on) and table data are stored, which are used for various calculations.

Figure 3:
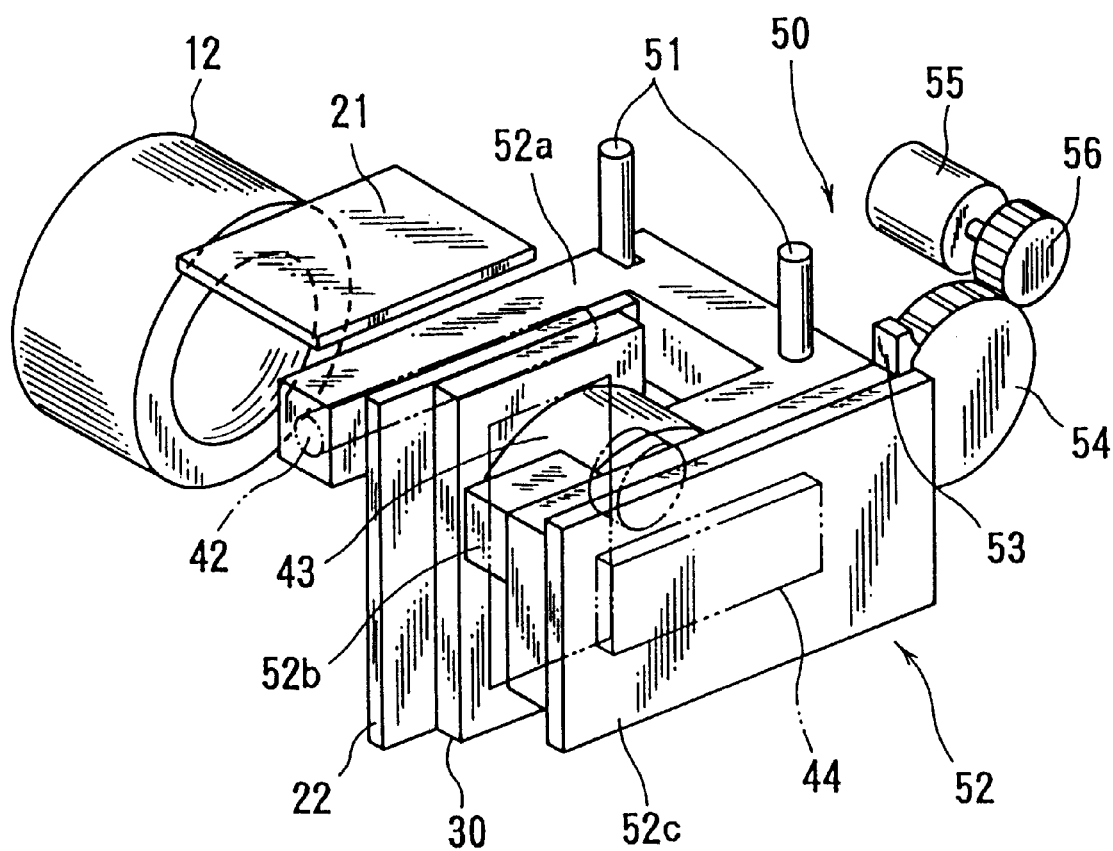
FIG. 3 is a perspective view showing a scanning mechanism and members provided around the mechanism.

FIG. 3 shows the structure of the scanning mechanism 50 and members provided around the mechanism 50.

The scanning mechanism 50 has a moving member 52 which is slidably supported by a pair of guide shafts 51 and has first and second leg portions 52a and 52b and a support portion 52c. The first leg portion 52a is extended between the quick return mirror 21 and the shutter 22, and the second leg portion 52b is extended behind the electro-developing recording medium 30. The support portion 52c is provided behind the second leg portion 52b. The light source 42, the scanner optical system 43 and the line sensor 44 are attached to the first leg portion 52a, the second leg portion 52b and the support portion 52c, respectively. The light source 42 and the line sensor 44 are extended in horizontal directions, respectively. A rack 53 fixed to the moving member 52 is meshed with a pinion 54 which is meshed with a gear 56 provided on an output shaft of a scan drive motor 55.

While not performing the reading out of an image from the electro-developing recording medium 30, the moving member 52 is positioned offset from a path between the photographing optical system 12 and the electro-developing recording medium 30, the position being below the electro-developing recording medium 30, for example. When a photographing operation has been completed and an image has been developed in the electro-developing recording medium 30, the scan drive motor 55 is operated by operating the scan start switch 16, the moving member 52 is moved upward so that a scan of the line sensor 44 is carried out, and the line sensor 44 is moved in a direction perpendicular to the longitudinal direction of the line sensor 44.

Figure 4:
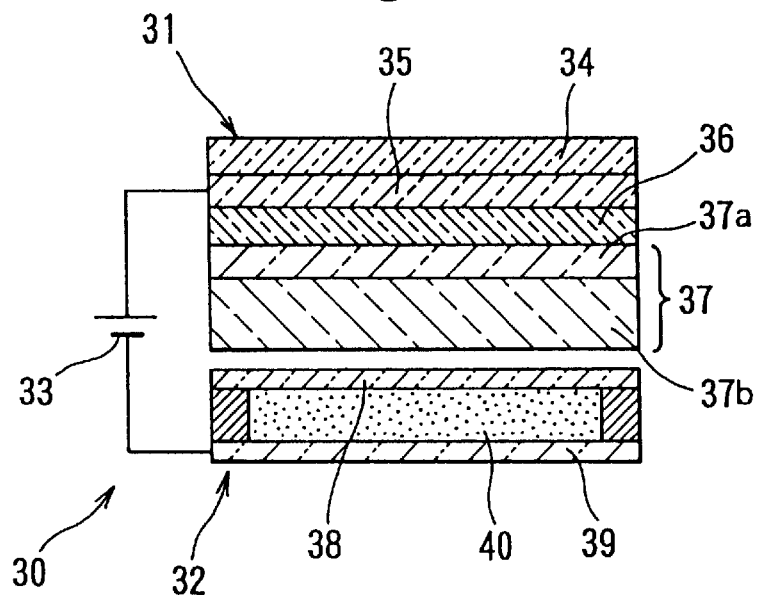
FIG. 4 is a sectional view showing a first example of a structure of an electro-developing recording medium.

FIG. 4 shows a first example of a structure of the electro-developing recording medium 30, and is the same as that shown in Japanese Unexamined Patent Publication No. 5-2280.

The electro-developing recording medium 30 has an electrostatic information recording medium 31 and an electric charge keeping medium 32, and an electric voltage is applied thereto by a power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge keeping medium 32 is a liquid crystal display having a memory-type liquid crystal, and thus, the developed visible image is kept therein even if the electric field is removed. In the liquid crystal display, the developed visible image can be deleted by heating the liquid crystal display, using a heating device (not shown) at a predetermined temperature. In such a case, the same electric charge keeping medium 32 can be used repeatedly.

Figure 5:
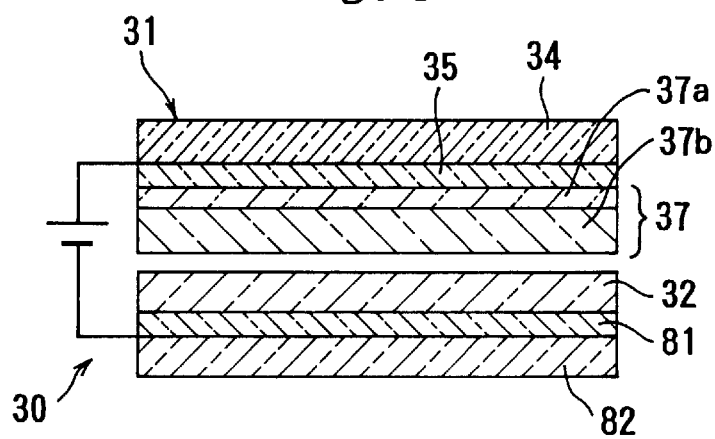
FIG. 5 is a sectional view showing a second example of a structure of an electro-developing recording medium.

FIG. 5 shows a second example of a structure of the electro-developing recording medium 30, and is the same as that shown in Japanese Unexamined Patent Publication No. 5-165005.

The electrostatic information recording medium 31 is formed by laminating the base plate 34, the electrode layer 35 and the photoconducting layer 37, and the photoconducting layer 37 is formed by laminating the electric charge generating layer 37a and the electric charge transferring layer 37b. The electric charge keeping medium 32 is a liquid crystal display having a memory-type liquid crystal, and faces the photoconducting layer 37 with a small gap therebetween. An electrode layer 81 and a base plate 82 are laminated on a surface of the electric charge keeping medium 32, which surface is opposite to the electrostatic information recording medium 31. The other structures are the same as those of shown in FIG. 4.

Figure 6:
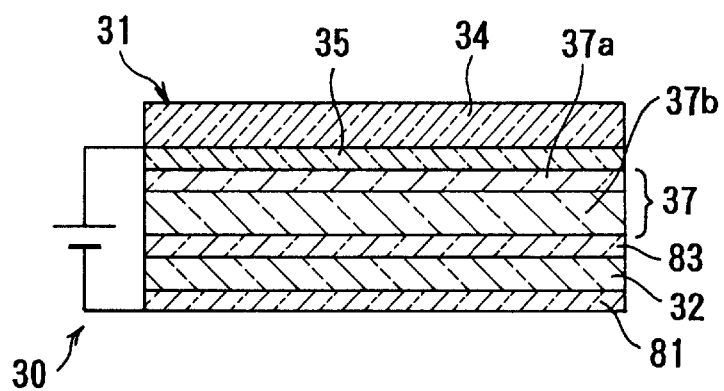
FIG. 6 is a sectional view showing a third example of a structure of an electro-developing recording medium.

FIG. 6 shows a third example of a structure of the electro-developing recording medium 30, and is the same as that shown in Japanese Unexamined Patent Publication Nos. 6-130347 and 7-13132.

This electro-developing recording medium 30 is of a uni-body type. In the electro-developing recording medium 30, an insulating layer 83 is provided between the electric charge transferring layer 37b of the electrostatic information recording medium 31 and the electric charge keeping medium 32 which is a liquid crystal display having a memory-type liquid crystal, and an electrode layer 81 is laminated on a surface of the electric charge keeping medium 32 which surface is opposite to the electrostatic information recording medium 31. The other structures are the same as those of shown in FIG. 5. Namely, no gap is formed between the electrostatic information recording medium 31 and the electric charge keeping medium 32.

The electro-developing recording medium 30 shown in FIGS. 4 through 6 can be used in the still video camera having an electric circuit shown in FIG. 2, and in the following description, it is supposed that the still video camera is provided with the electro-developing recording medium 30 shown in FIG. 4.

Figure 7B:
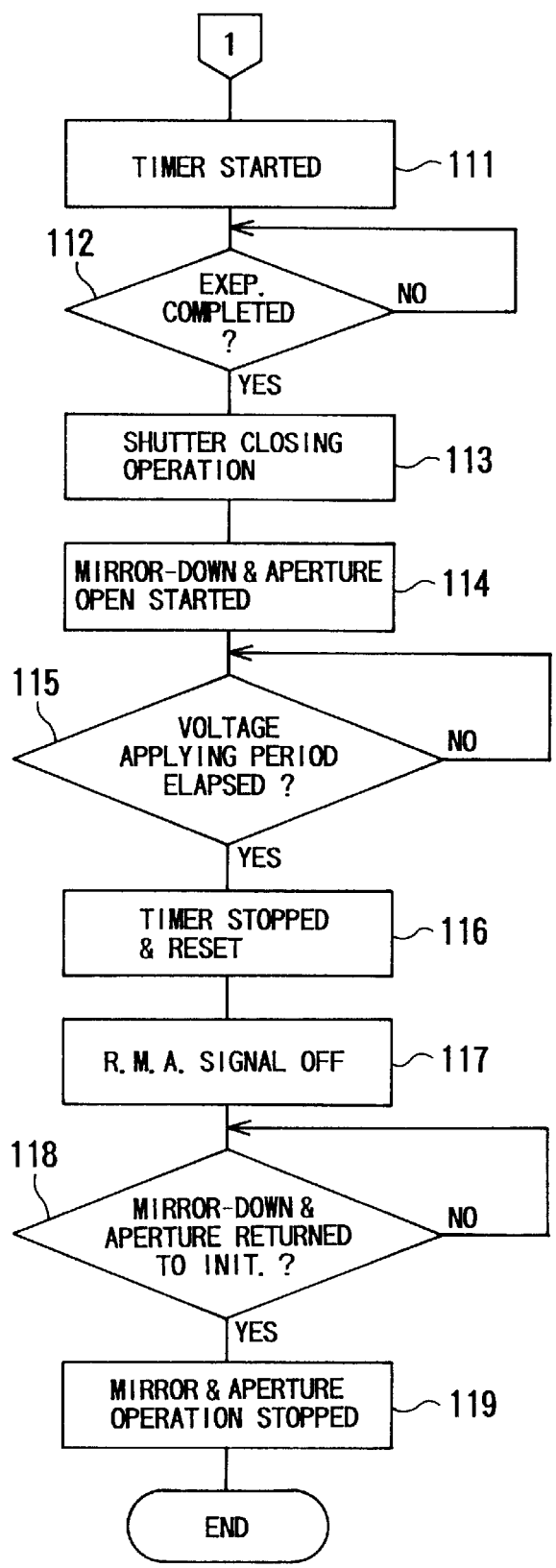
FIG. 7B is a second part of the flow chart shown in FIG. 7A.
Figure 7C:
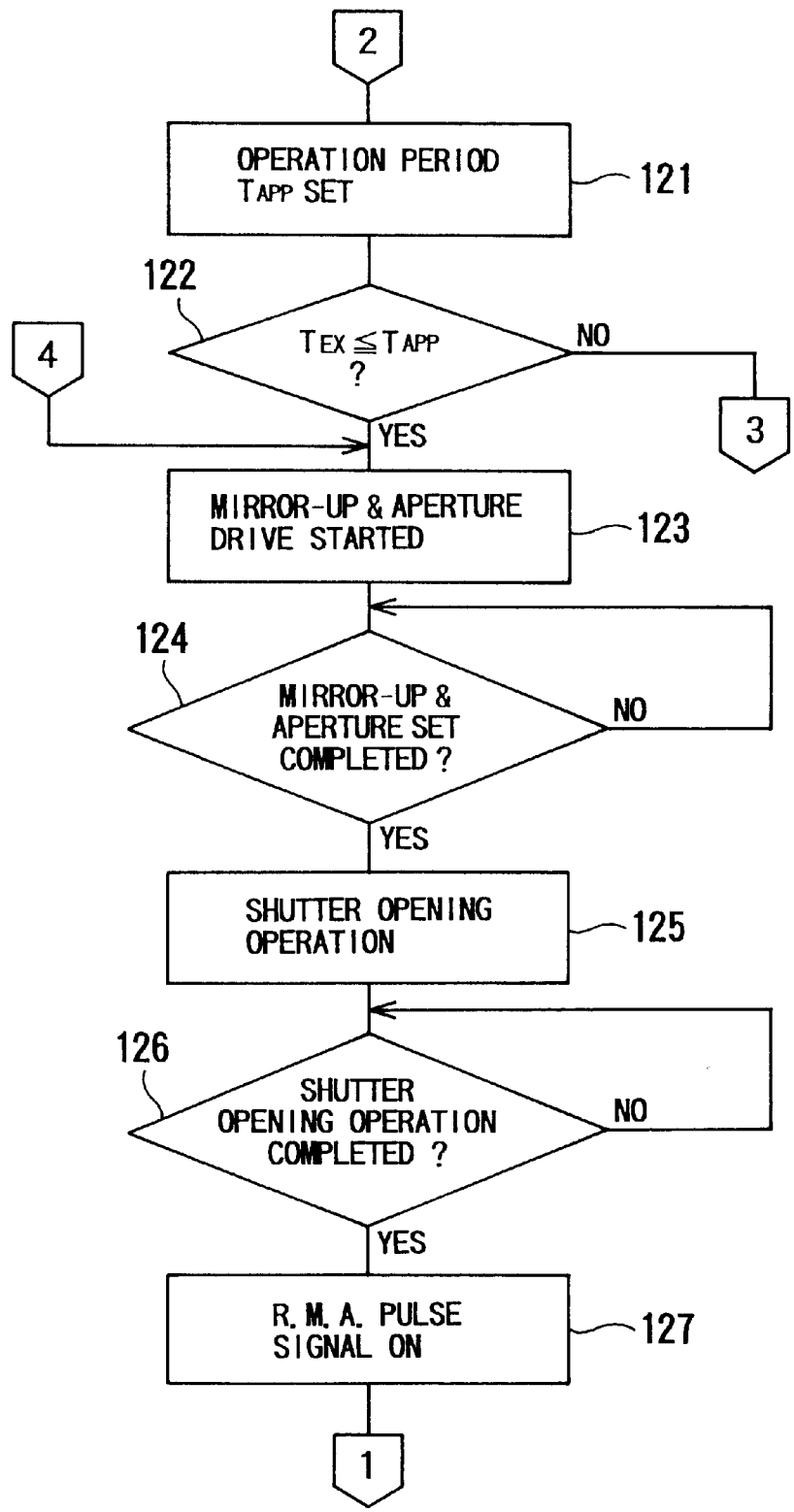
FIG. 7C is a third part of the flow chart shown in FIGS. 7A and 7B.
Figure 7D:
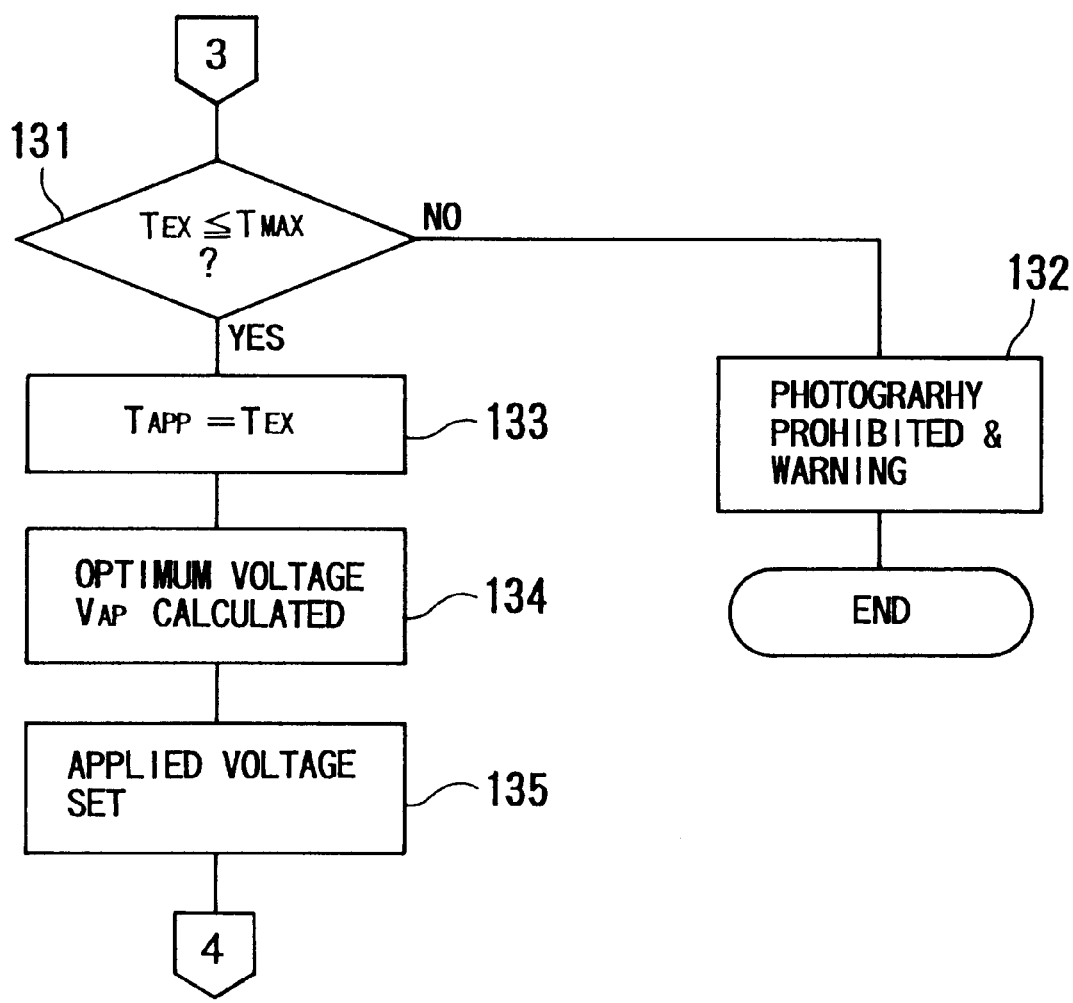
FIG. 7D is a fourth part of the flow chart shown in FIGS. 7A, 7B and 7C.
Figure 8:
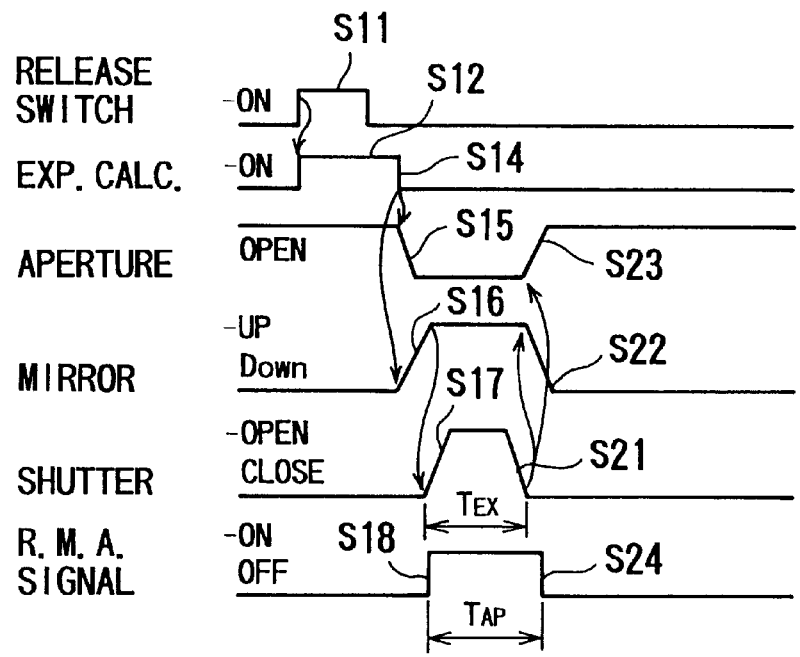
FIG. 8 is a timing chart showing the photographing operation in which a set exposure period is shorter than a standard period.
Figure 9:
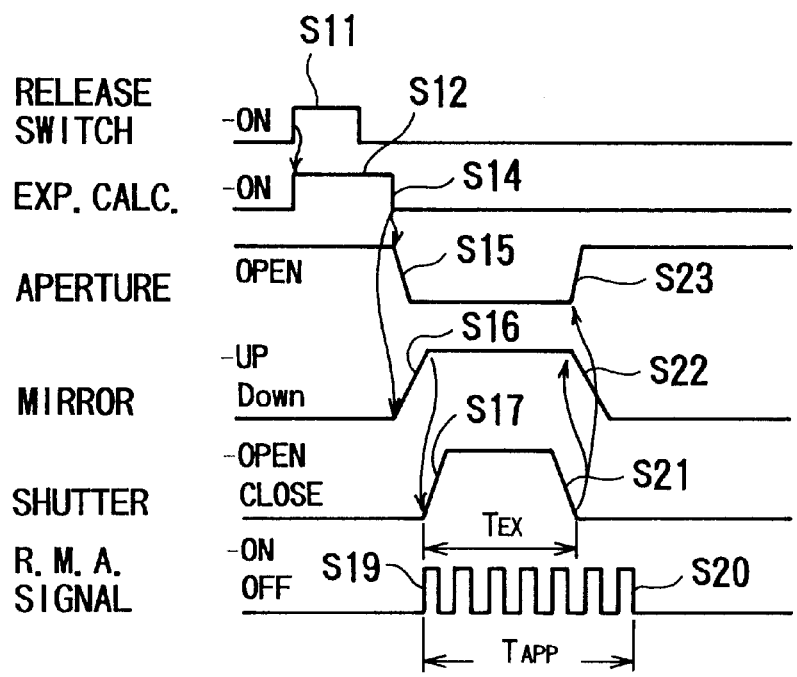
FIG. 9 is a timing chart showing the photographing operation in which a set exposure period is longer than a standard period.

FIGS. 7A through 7D show a flow chart of a photographing operation of a first embodiment, and FIGS. 8 and 9 are a timing chart of the photographing operation. With reference to these drawings, an operation of the first embodiment will be described. First, an operation shown in FIG. 8 will be described, in which an exposure period $T_{EX}$ is obtained based on a photometry value being less than or equal to the output period (i.e., standard period $T_{AP}$) of the continuously outputted recording medium activating signal. In other words, the recording medium activating signal is a direct current (DC) signal.

When it is sensed in Step 101 that the release switch 14 has been depressed (reference S11), an output signal of the photometry sensor 28, i.e., a photometry value, is sensed in Step 102. In Step 103, an exposure calculation is started based on the photometry value (reference S12). When it is confirmed in Step 104 that the exposure calculation has been completed to obtain a set exposure period $T_{EX}$ (reference S14), it is determined in Step 105 whether the set exposure period $T_{EX}$ obtained in Step 104 is less than or equal to a standard period $T_{AP}$. The recording medium activating signal is provided for applying an electric voltage to the electro-developing recording medium 30, and the standard period $T_{AP}$ is set based on an experimental result, for example, so that an image developed by the electro-developing recording medium 30 has an optimum contrast. Namely, in this embodiment, the standard period $T_{AP}$ is a fixed value. Note that the voltage $V_{AP}$ applied to the electro-developing recording medium 30 for the standard period $T_{AP}$ has a value obtained by a table corresponding to FIG. 10.

In the example shown in FIG. 8, it is determined in Step 105 that the set exposure period $T_{EX}$ is less than or equal to the standard period $T_{AP}$. Therefore, Steps 106 through 119 are executed, so that a photographing operation is performed.

In Step 106, the opening degree of the aperture 12a is changed from the fully open state to a predetermined opening degree (reference S15), and the quick return mirror 21 is changed from the down condition to the up-condition (reference S16). When it is confirmed in Step 107 that the quick return mirror 21 has been changed to the up-condition and the opening degree adjustment of the aperture 12a has been completed, the shutter is started to open in Step 108 (reference S17). In this embodiment, the shutter 22 is a focal-plane shutter, and therefore, a magnet for performing a shutter charge is deenergized in Step 108. Note that the up-condition and the down-condition of the quick return mirror 21 are sensed by a sensor (not shown), and the opening degree of the aperture 12a is sensed by an encoder (not shown) outputting a signal corresponding to the amount of movement of the aperture 12a.

In Step 109, it is determined whether the opening operation of the shutter 22 has been completed. This determination is carried out by measuring a time period beginning when the magnet is deenergized, i.e., the time after the opening operation of the shutter is started in Step 108. When the shutter 22 is fully opened, a recording medium activating signal is outputted in Step 110 (reference S18), and a timer is started in Step 111. Due to the output of the recording medium activating signal, a predetermined electric voltage is applied to the electro-developing recording medium 30. By exposing the electro-developing recording medium 30 under this condition, the object image is developed on the electro-developing recording medium 30 as a visible image, which is kept on the electro-developing recording medium 30 even after the output of the recording medium activating signal is stopped.

When, in Step 112, the set exposure period $T_{EX}$ determined by the exposure calculation has passed and it is sensed that the exposure has been completed, the shutter 22 is closed in Step 113 (reference S21). By the completion of the closing operation of the shutter 22, Step 114 is executed so that the quick return mirror 21 is changed to the down-condition (reference S22) and the aperture 12a is driven to the fully open condition (reference S23). After these operations of the mirror 21 and the aperture 12a are started, Step 115 is executed, in which it is determined whether the standard period $T_{AP}$ (voltage applying period) has elapsed based on the value of the timer started in Step 111. When the standard period $T_{AP}$ has passed, the timer is stopped and reset in Step 116, and the output of the recording medium activating signal is stopped (reference S24) in Step 117. Namely, for the standard period $T_{AP}$ which begins when the exposure is started (that is, the shutter 22 fully open), the recording medium activating signal is continuously outputted even after the exposure has been completed as shown in FIG. 8. Then, when it is confirmed in Step 118 that the mirror 21 and the aperture 12a have returned to the initial conditions, respectively, the operations of the mirror 21 and the aperture 12a are stopped in Step 119, and thus, this photographing operation program ends.

An operation shown in FIG. 9 will be described, in which the set exposure period $T_{EX}$ is longer than the standard period $T_{AP}$ (FIG. 8), and the recording medium activating signal is intermittently outputted as pulse signals. In other words, the recording medium activating signal is outputted as signals including an alternating current (AC) component.

Namely, when it is determined in Step 105 that the set exposure period $T_{EX}$ is longer than the standard period $T_{AP}$, Step 121 and the following Steps are executed, and if a predetermined condition is satisfied, the recording medium activating signal is intermittently outputted, so that the total amount of intermittent output periods of the recording medium activating signal is equal to the standard period $T_{AP}$.

In Step 121, an operation period $T_{APP}$, in which the recording medium activating signal is intermittently outputted as a pulse signal from the beginning of output to the end of output, is set. In this embodiment, the duty ratio of the pulse signal is 0.5, and therefore, the operation period $T_{APP}$ is twice the standard period $T_{AP}$. In Step 122, it is determined whether the set exposure period $T_{EX}$ is less than or equal to the operation period $T_{APP}$. When the set exposure period $T_{EX}$ is less than or equal to the operation period $T_{APP}$, Steps 123 through 127 are executed, so that the recording medium activating signal is outputted in the form of a pulse signal.

The contents of Steps 123 through 126 are the same as those of Steps 106 through 109. In Step 127, output of the recording medium activating pulse signal is started (reference S19) Then, the timer is started in Step 111, and Step 112 is executed in which it is determined whether the set exposure period $T_{EX}$ has passed, or whether the exposure has been completed. When the exposure has been completed, the shutter 22 is closed in Step 113, and the mirror 21 is changed to the down-position and the aperture 12a is closed in Step 114. Then, when it is determined in Step 115 that the operation period $T_{APP}$ has passed based on the value of the timer, the timer is stopped in Step 116, and the output of the recording medium activating pulse signal is stopped in Step 117 (reference S20).

During the period from Step 127 through Step 117, the recording medium activating signal is repeatedly turned ON and OFF at a predetermined interval. Namely, a voltage is applied to the liquid crystal 40 of the electro-developing recording medium 30 (see FIG. 4) at each alternate interval.

Figure 10:
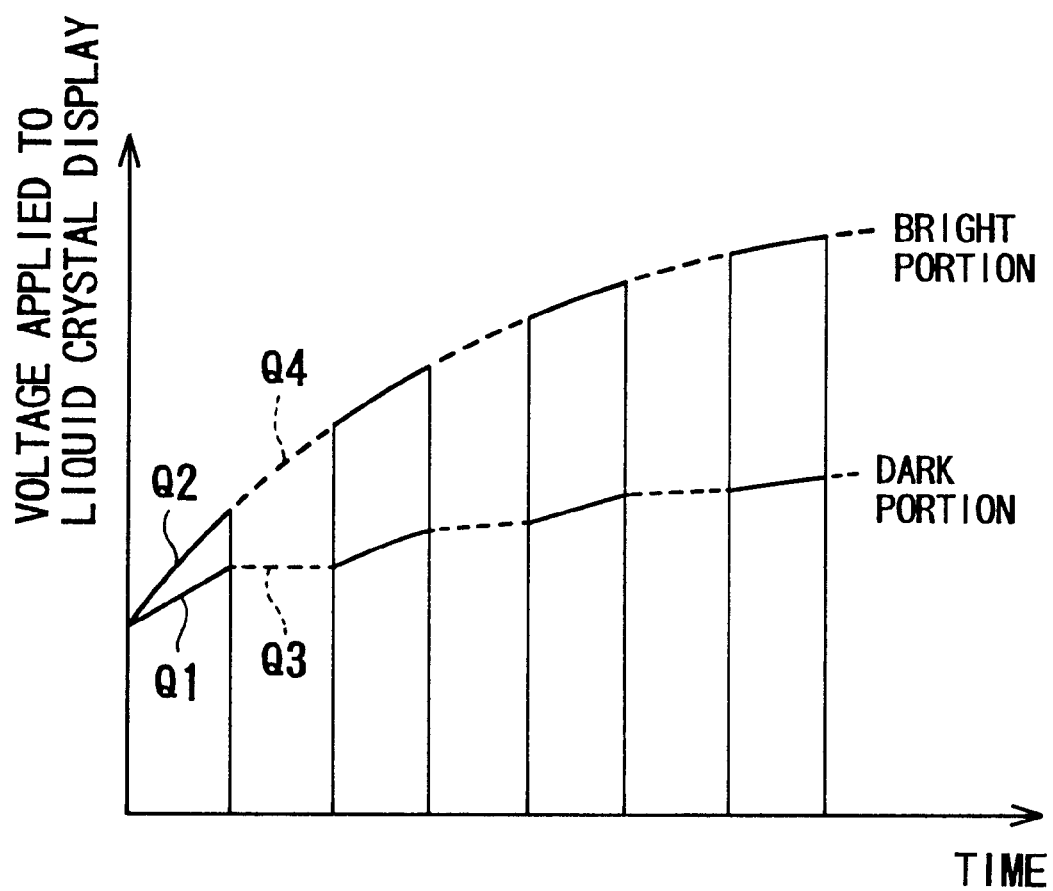
FIG. 10 is a view showing a change of voltages generated in a dark portion and a bright portion of a liquid crystal display.

As shown in FIG. 10, while a voltage is applied to the electro-developing recording medium 30, the voltages generated in a dark portion and a bright portion of the liquid crystal display 40 increase with time. The increase rate of the voltages change in accordance with the resistive value of the electrostatic information recording medium 31. Namely, in the dark portion, since the resistive value is large, the increase rate of the voltage is small as shown by reference Q1, and in the bright portion, since the resistive value is small, the increase rate of the voltage is large as shown by reference Q2. On the other hand, while no voltage is applied to the liquid crystal display 40, in the dark portion, since the resistive value does not change because there are no incident light beams, the generated voltage does not increase as shown by reference Q3, while, in the bright portion, the generated voltage does increase as shown by reference Q4, since the resistive value changes at every moment, due to the incidence of light beams.

Therefore, when the total amount of periods for which the voltages are applied to the liquid crystal display 40 is constant, the voltage difference generated in the bright portion and the dark portion is higher when the voltage is intermittently applied than when the voltage is continuously applied, and the contrast of the image generated in the liquid crystal display 40 is larger when the voltage is intermittently applied.

Thus, the output of the recording medium activating signal is stopped in Step 117. Then, after it is confirmed in Step 118 that the mirror 21 and the aperture 12a have returned to the initial positions, respectively, the program of the photographing operation ends.

On the other hand, when it is determined in Step 122 that the set exposure period $T_{EX}$ is longer than the operation period $T_{APP}$, it is determined in Step 131 whether the set exposure period $T_{EX}$ is less than or equal to the maximum period $T_{MAX}$ for which the recording medium activating signal can be intermittently outputted. This maximum period $T_{MAX}$ is set based on the minimum value of the applied voltage which is necessary to obtain an optimum contrast for the image. The reason for this will be described below with reference to FIGS. 11 and 12.

Figure 11:
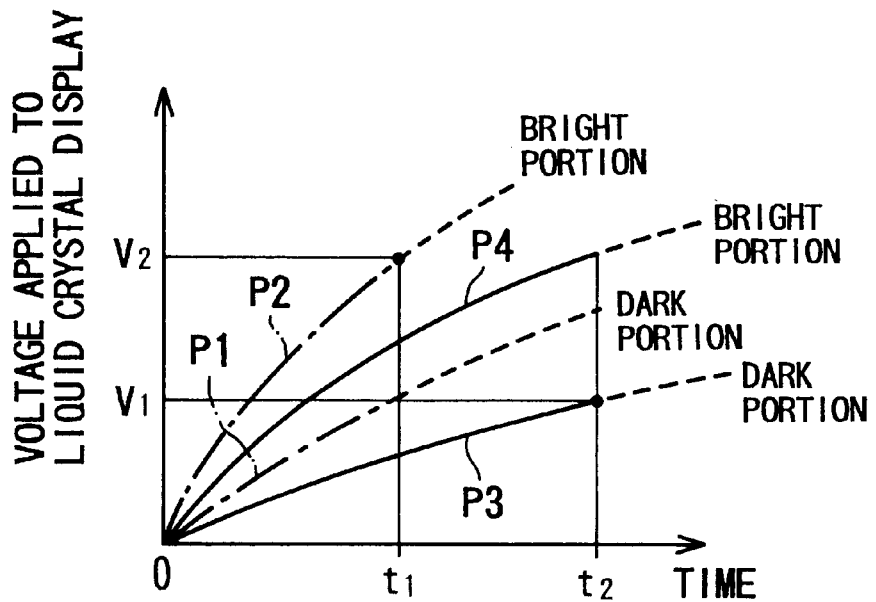
FIG. 11 is a view showing a relationship between a voltage applying period and a voltage generated in the liquid crystal.

As shown in FIG. 11, it is supposed that, when a relatively high voltage is applied to the electro-developing recording medium 30, voltages shown by references P1 and P2 are generated in the bright and the dark portions of the liquid crystal display 40, so that a voltage difference ($V_2-V_1$) is generated in the bright and the dark portions at time $t_1$, and thus a predetermined contrast is obtained. If a relatively low voltage is applied to the electro-developing recording medium 30, the increase rate of the voltage in the liquid crystal display 40 becomes gentle as shown by references P3 and P4. Therefore, to obtain the same contrast as obtained when the applied voltage was high, that is, to obtain the voltage difference ($V_2-V_1$), a time $t_2$, which is longer than the time $t_1$, is needed.

Figure 12:
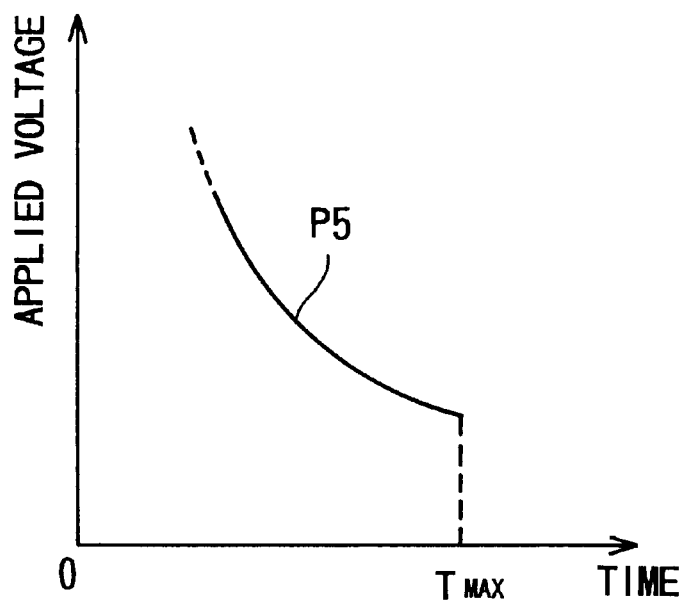
FIG. 12 is a view showing a relationship between a voltage applying period and an applied voltage to obtain a predetermined contrast.

FIG. 12 shows a relationship between a voltage applying period and an applied voltage to obtain a predetermined contrast. As shown by the solid line P5 in this drawing, the relationship between the voltage applying period and the applied voltage is shown by a hyperbola, and it is understood that the applied voltage should be lowered for lengthening the voltage applying period. When the applied voltage is too low, however, the voltage in the dark portion will not reach the value which is necessary to operate the liquid crystal display 40 (the voltage $V_1$ shown in FIG. 11, for example). Therefore, the applied voltage cannot be lowered infinitely, and thus, there is a maximum period $T_{MAX}$ for the voltage application.

With reference to FIG. 7D, when it is determined in Step 131 that the set exposure period $T_{EX}$ is less than or equal to the maximum period $T_{MAX}$, Step 133 and the following Steps are executed so that the photographing operation is performed. In Step 133, the set exposure period $T_{EX}$ is set as the operation period $T_{APP}$. In other words, the operation period $T_{APP}$ for which the recording medium activating signal is intermittently outputted is set in such a manner that the length of the operation period $T_{APP}$ is equal to the length of the period for which the shutter 22 is open. In Step 134, an optimum applied voltage $V_{AP}$ is calculated based on the operation period $T_{APP}$. This calculation is carried out in such a manner that, with reference to, for example, a table (see FIG. 12) indicating a relationship between the voltage applying period and the applied voltage, an applied voltage $V_{AP}$ corresponding to the operation period ($T_{AP} \times 0.5$) is read from the table, since the duty ratio is 0.5.

In Step 135, a signal corresponding to the applied voltage $V_{AP}$ obtained in Step 134 is outputted to the recording medium drive circuit 41 (see FIG. 2), in which a control for applying the voltage $V_{AP}$ to the electro-developing recording medium 30 is performed based on the signal. Then, Steps 123 through 127 and 111 through 119 are executed, so that the photographing operation is carried out based on the pulse recording medium activating signal, similarly as the above.

Thus, when the set exposure period $T_{EX}$ is longer than the operation period $T_{APP}$ set in Step 121, if the set exposure period $T_{EX}$ is less than or equal to the maximum period $T_{MAX}$, the set exposure period $T_{EX}$ is determined as the operation period $T_{APP}$, and the electro-developing recording medium 30 is operated using the applied voltage $V_{AP}$ obtained based on the operation period $T_{APP}$, and thus, the photographing operation is performed. Therefore, even in such a case, a recording operation of the electro-developing recording medium 30 can be performed under a proper condition, so that a desired image can be obtained.

On the other hand, if it is determined in Step 131 that the set exposure period $T_{EX}$ is longer than the maximum period $T_{MAX}$, an image having a proper contrast cannot be obtained, and it is deemed that the exposure is impossible. Namely, Step 132 is executed, in which a process for prohibiting the photographing operation is performed, and a warning meaning that the photographing operation is impossible is indicated on the display device 68. Then, the program of the photographing operation ends.

As described above, according to the first embodiment, even if the set exposure period $T_{EX}$ is shorter than a predetermined value due to the object being dark, the recording medium activating signal is outputted in the form of pulse signals, so that a contrast of the image formed in the liquid crystal display 40 is raised, and thus, a clear image can be recorded in the electro-developing recording medium 30.

Figure 13:
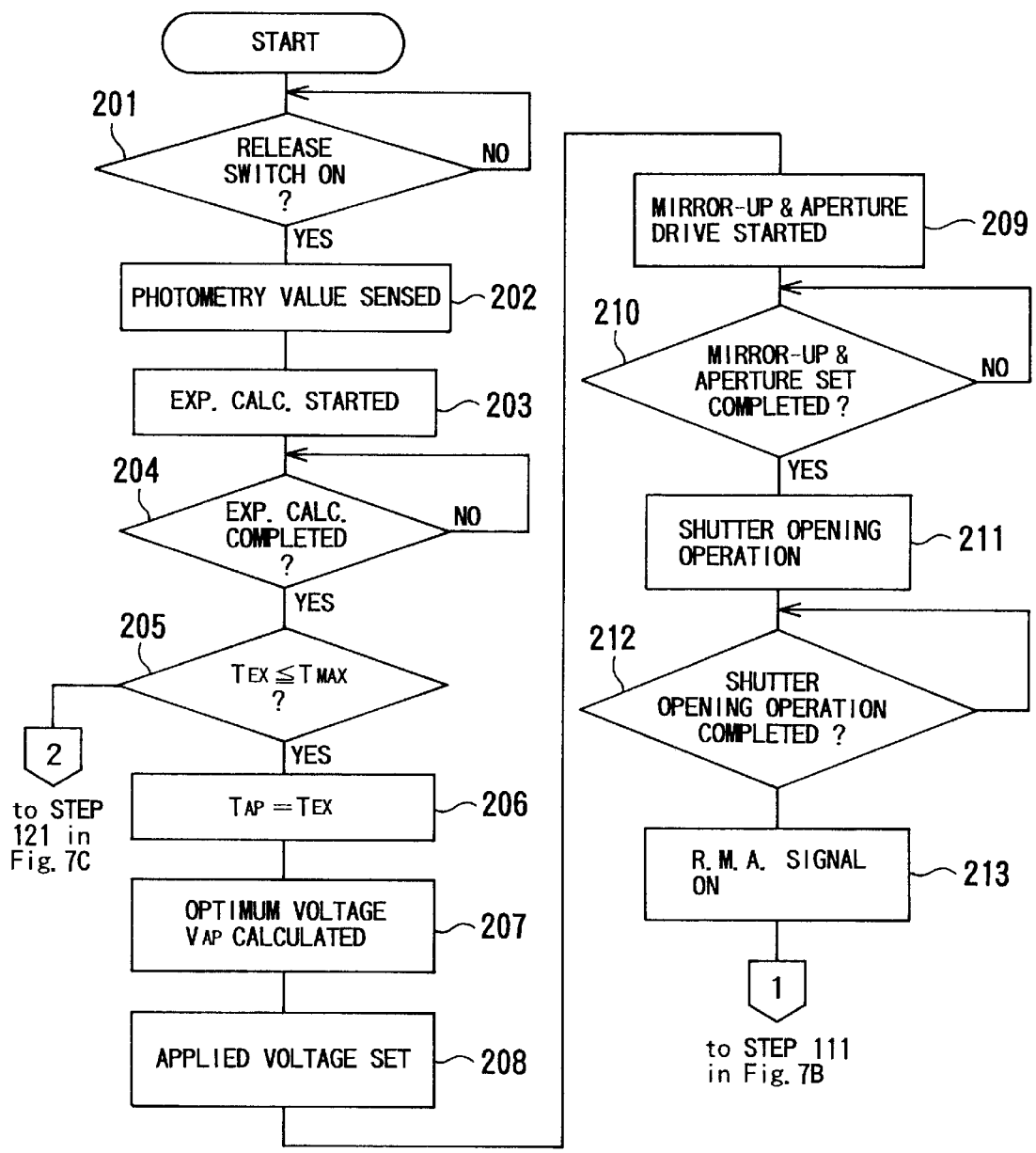
FIG. 13 is a part of a flow chart of a photographing operation of a second embodiment of the present invention.

FIG. 13 shows a flow chart of a photographing operation of a second embodiment of the present invention.

The contents of Steps 201 through 204 are the same as those of Steps 101 through 104 shown in FIG. 7A. In Step 205, similarly to Step 131 of FIG. 7D, it is determined whether the set exposure period $T_{EX}$ obtained in Step 204 is less than or equal to the maximum period $T_{MAX}$ for which the recording medium activating signal can be continuously outputted. When the set exposure period $T_{EX}$ is less than or equal to the maximum period $T_{MAX}$, the process goes to Step 206, in which the set exposure period $T_{EX}$ is determined as the standard period $T_{AP}$. In Step 207, an optimum applying voltage $V_{AP}$ is calculated based on the standard period $T_{AP}$. This calculation is the same as that described with reference to Step 134 shown in FIG. 7D. Then, in Step 208, similarly to Step 135 shown in FIG. 7D, a signal corresponding to the applied voltage $V_{AP}$ obtained in Step 207 is outputted to the recording medium drive circuit 41, in which a control for applying the voltage $V_{AP}$ to the electro-developing recording medium 30 is performed based on the signal. The contents of Steps 209 through 213 and the following Steps (not shown) are the same as those of Steps 106 through 110 shown in FIG. 7A and Steps 111 through 119 shown in FIG. 7B. Namely, in the second embodiment, the exposure period and the voltage applying period are controlled in such a manner that these periods have the same values.

On the other hand, when it is determined in Step 205 that the set exposure period $T_{EX}$ is longer than the maximum period $T_{MAX}$, the processes shown in FIGS. 7C and 7D are executed.

As described above, in the second embodiment, it is determined in Step 205 whether the set exposure period $T_{EX}$ is less than or equal to the maximum period $T_{MAX}$, and when the set exposure period $T_{EX}$ is less than or equal to the maximum period $T_{MAX}$, after the executions of Steps 206 through 208, Step 209 and the following Steps are executed to carry out the photographing operation. The other processes are the same as those of the operation shown in FIGS. 7A through 7D. Therefore, the same effect as that of the first embodiment is obtained by the second embodiment.

Figure 14:
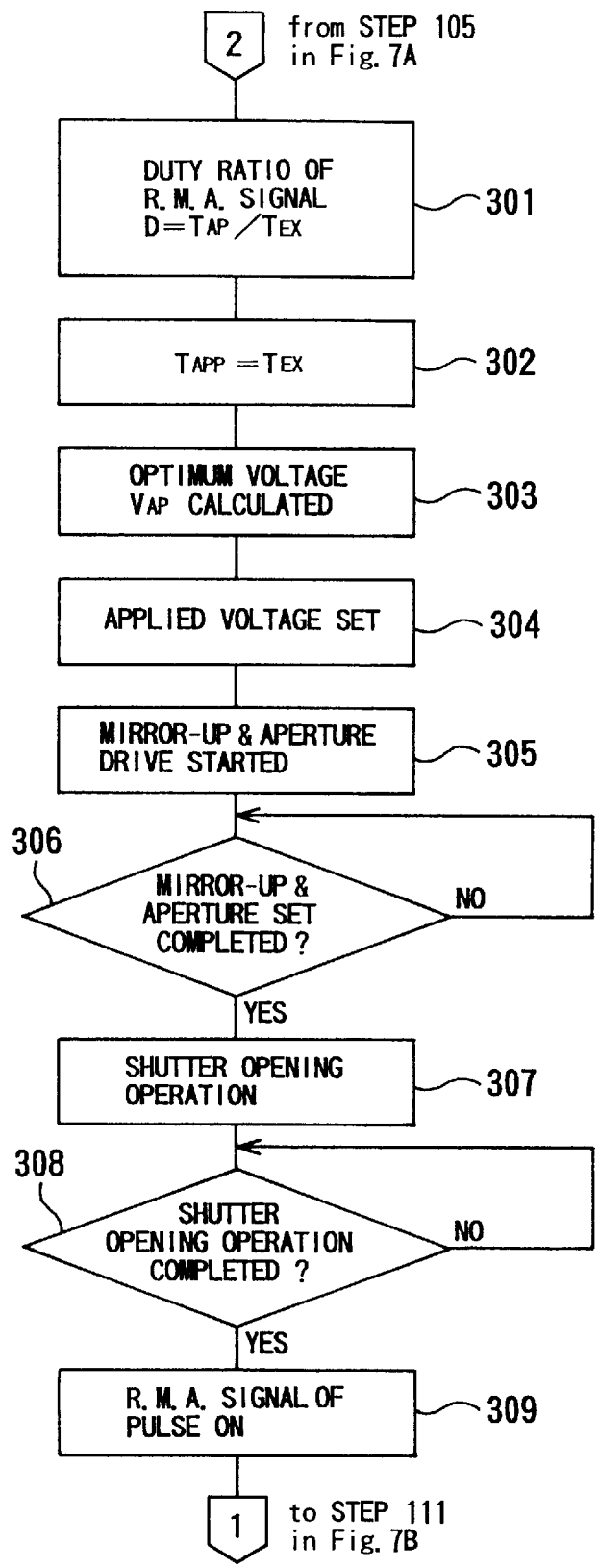
FIG. 14 is a part of a flow chart of a photographing operation of a third embodiment of the present invention.

FIG. 14 shows a flow chart of a photographing operation of a third embodiment of the present invention.

The contents of the process executed before Step 301 are the same as those of Steps 101 through 105 shown in FIG. 7A. Namely, in the third embodiment, when it is determined that the set exposure period $T_{EX}$ is longer than the standard period $T_{AP}$ (see Step 105 of FIG. 7A), Step 301 is executed in which the duty ratio D of the recording medium activating signal, which is intermittently outputted, is set to $$D = T_{AP}/T_{EX}$$

Namely, the duty ratio is the ratio of the standard period $T_{AP}$ to the set exposure period $T_{EX}$.

The contents of Steps 302 through 304 are the same as those of Steps 133 through 135 of FIG. 7D, and the contents of Steps 305 through 309 are the same as those of Steps 123 through 127 of FIG. 7C. After the execution of Step 309, the same process as in Steps 111 through 119 of FIG. 7B is executed.

As described above, in the third embodiment, when the set exposure period $T_{EX}$ is longer than the standard period $T_{AP}$, the recording medium activating signal which is composed of pulse signals having a duty ratio corresponding to the lengths of the periods $T_{EX}$ and $T_{AP}$ is generated. For example, when the set exposure period $T_{EX}$ is 0.04 seconds and the standard period $T_{AP}$ is 0.03 seconds, pulse signals (the duty ratio of which will be 0.03/0.04 or 0.75) are generated as the recording medium activating signal. According to the construction of the third embodiment, regardless of the length of the set exposure period $T_{EX}$, a photographing operation can always be carried out.

Figure 15:
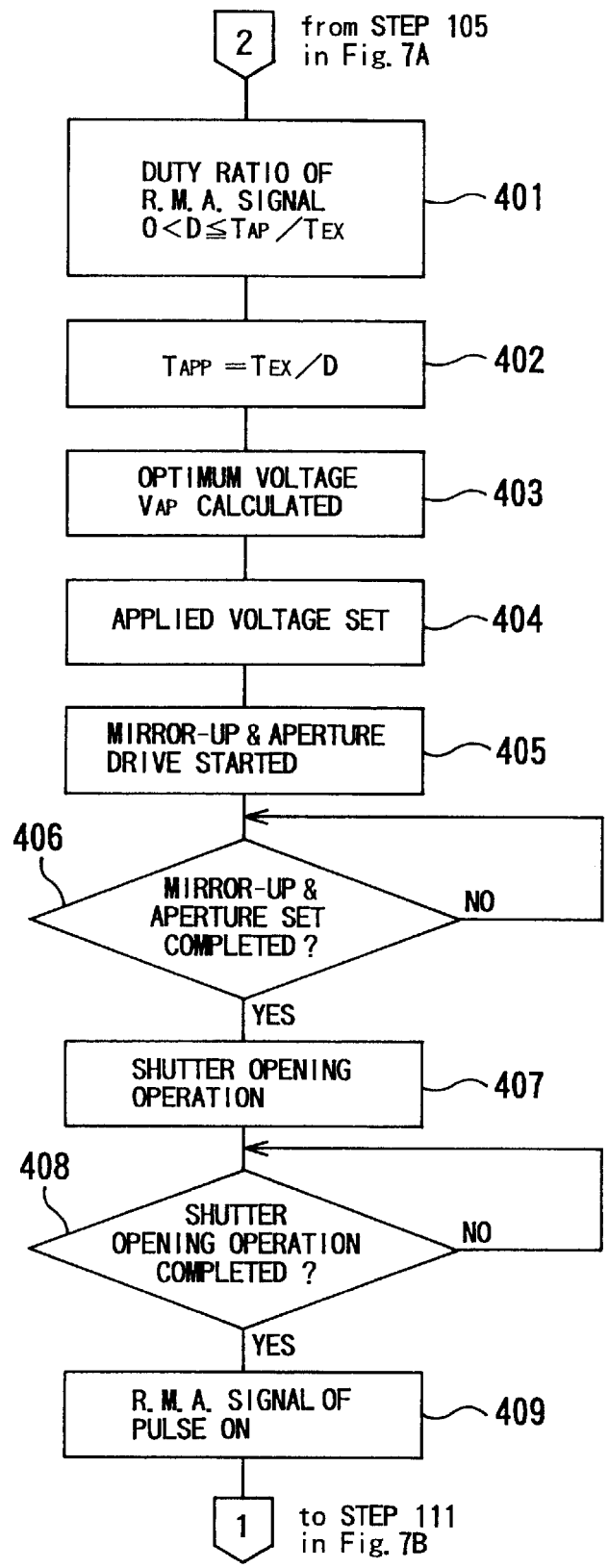
FIG. 15 is a part of a flow chart of a photographing operation of a fourth embodiment of the present invention.

FIG. 15 shows a flow chart of a photographing operation of a fourth embodiment of the present invention.

Steps 401 through 409 correspond to Steps 301 through 309 of the third embodiment. Namely, the contents of the process executed before Step 401 are the same as those of Steps 101 through 105 shown in FIG. 7A, and Step 401 is executed when it is determined that the set exposure period $T_{EX}$ is longer than the standard period $T_{AP}$. In Step 401, the duty ratio D of the recording medium activating signal is set within the range of:

$$0 < D \leq T_{AP}/T_{EX}$$

Namely, the duty ratio is larger than 0, and less than or equal to the ratio of the standard period $T_{AP}$ to the set exposure period $T_{EX}$. The duty ratio is set in such a manner that the maximum value is selected from the value contained within the range, the value being defined with increments every 0.01. For example, if the ratio $T_{AP}/T_{EX}$ is 0.5327, the duty ratio D is set to 0.53.

In Step 402, the operation period $T_{APP}$ from the start of output of the recording medium activating signal to the end of output is obtained by dividing the set exposure period $T_{EX}$ by the duty ratio. The contents of Steps 403 through 409 and the following Steps are the same as those of Steps 303 through 309 and the following Steps of the third embodiment.

Thus, in the fourth embodiment, except that the duty ratio of the recording medium activating signal is set to a predetermined value contained within the range described above, the photographing operation is carried out similarly to the third embodiment. Therefore, according to the fourth embodiment, the same effects as those obtained by each of the embodiments described above are obtained. The fourth embodiment is useful when the duty ratio is restricted due to circuit design.

Note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 7-080686 and 7-208501 (filed on Mar. 13 and Jul. 25, 1995, respectively) which are expressly incorporated herein, by reference, in their entirety.

We claim:

1. A device for controlling a photographing operation of an electro-developing type camera, said control device comprising:

an electro-developing recording medium that electronically develops an image which is formed by exposing said electro-developing recording medium;

means for outputting a recording medium activating signal so that said electro-developing recording medium begins to develop said image;

means for performing an exposure calculation based on a photometry value, so that a set exposure period, for which said electro-developing recording medium is to be exposed to develop said image, is determined; and first determining means for determining whether said set exposure period is shorter than a standard period;

said output means outputting said recording medium activating signal as a pulse signal having a predetermined duty ratio when the set exposure period is longer than the standard period, such that a total amount of intermittent output periods of said recording medium activating signal is equal to said standard period.

2. A control device according to claim 1, wherein said standard period is set in such a manner that said image developed by said electro-developing recording medium has an optimum contrast.

3. A control device according to claim 1, further comprising second determining means for determining whether said set exposure period is shorter than an operation period from a start of said intermittent output of said recording medium activating signal to an end of said intermittent output when said set exposure period is longer than said standard period, said outputting means intermittently outputting said recording medium activating signal when said set exposure period is shorter than said operation period.

4. A control device according to claim 3, further comprising third determining means for determining whether said set exposure period is shorter than a maximum period for which said recording medium activating signal can be outputted when said set exposure period is longer than said operation period, said outputting means setting an optimum voltage applied to said electro-developing recording medium and intermittently outputting said recording medium activating signal having said optimum voltage when said set exposure period is shorter than said maximum period.

5. A control device according to claim 4, further comprising means for prohibiting an exposure of said electro-developing recording medium when it is determined by said third determining means that said set exposure period is longer than said maximum period.

6. A control device according to claim 1, wherein said predetermined duty ratio has a value which is larger than 0 and less than or equal to a ratio of said standard period to said set exposure period.

7. A control device according to claim 1, wherein said electro-developing recording medium comprises an electrostatic information recording medium generating an electric charge in accordance with an image formed thereon, and an electric charge keeping medium which generates a visible image in accordance with said electric charge and which can keep said visible image.

8. A control device according to claim 7, wherein said electric charge keeping medium comprises a liquid crystal display having a memory-type liquid crystal.

9. A control device according to claim 1, wherein when said set exposure period is longer than said standard period, said output means outputs said recording medium activating signal as a pulse signal having a duty ratio of 0.5 for a period twice said standard period.

10. A device for controlling a photographing operation of an electro-developing type camera, said control device comprising:

an electro-developing recording medium that electronically develops an image which is formed by exposing said electro-developing recording medium;

means for outputting a recording medium activating signal so that said electro-developing recording medium begins to develop said image;

means for performing an exposure calculation based on a photometry value, so that a set exposure period, for which said electro-developing recording medium is to be exposed to develop said image, is determined; and first determining means for determining whether said set exposure period is shorter than a maximum period for which said recording medium activating signal can be outputted;

said output means setting an optimum voltage applied to said electro-developing recording medium, said output means continuously outputting said recording medium activating signal having said optimum voltage, and said output means intermittently outputting said recording medium activating signal as a pulse system having a predetermined duty ratio when a set exposure period is longer than a standard period so that a total amount of intermittent output periods of said recording medium activating signal is equal to a standard period.

11. A control device according to claim 10, wherein said standard period is set in such a manner that said image developed by said electro-developing recording medium has an optimum contrast.

12. A control device according to claim 10, further comprising second determining means for determining whether said set exposure period is shorter than an operation period from a start of said intermittent output of said recording medium activating signal to an end of said intermittent output when said set exposure period is longer than said maximum period, said output means intermittently outputting said recording medium activating signal when said set exposure period is shorter than said operation period.

13. A control device according to claim 12, further comprising third determining means for determining whether said set exposure period is shorter than said maximum period when said set exposure period is longer than said operation period, said outputting means setting an optimum voltage applied to said electro-developing recording medium and intermittently outputting said recording medium activating signal having said optimum voltage when said set exposure period is shorter than said maximum period.

14. A control device according to claim 13, further comprising means for prohibiting an exposure of said electro-developing recording medium when it is determined by said third determining means that said set exposure period is longer than said maximum period.

15. A control device according to claim 10, wherein said electro-developing recording medium comprises an electrostatic information recording medium generating an electric charge in accordance with an image formed thereon, and an electric charge keeping medium which generates a visible image in accordance with said electric charge and which can keep said visible image.

16. A control device according to claim 15, wherein said electric charge keeping medium comprises a liquid crystal display having a memory-type liquid crystal.

17. A device for controlling a photographing operation of an electro-developing type camera, said control device comprising:

an electro-developing recording medium that electronically develops an image which is formed by exposing said electro-developing recording medium;

means for outputting a recording medium activating signal so that said electro-developing recording medium begins to develop said image, said recording medium activating signal comprising a first signal which is a direct current signal and a second signal which includes an alternating current component;

means for performing an exposure calculation based on a photometry value, so that a set exposure period, for which said electro-developing recording medium is to be exposed to develop said image, is determined; and determining means for determining whether said set exposure period is shorter than a standard period;

said output means outputting said first signal for said standard period when said set exposure period is shorter than said standard period, and said outputting means outputting said second signal as a pulse signal having a predetermined duty ratio such that a total amount of intermittent output periods for which said second signal is output is equal to said standard period when said set exposure period is longer than said standard period.

* * * * *